UNITED STATES PATENT OFFICE.

CHARLES A. SEELY, OF NEW YORK, N. Y.

IMPROVEMENT IN EXTRACTS OF HOPS.

Specification forming part of Letters Patent No. 118,396, dated August 22, 1871.

*To all whom it may concern:*

Be it known that I, CHARLES A. SEELY, of the city, county, and State of New York, have invented a new Treatment of the Extract of Hops, of which the following is a specification:

The nature of my invention consists in the separation of the extract of hops into two portions, namely, the volatile part or the essential oil of hops, and the involatile part or the bitter matter of hops; and the object of my invention is to secure an economy in the use of hops which hitherto has been unattainable.

In the ordinary method of using hops and the extract of hops a large part of the volatile oil is unavoidably lost during the period of boiling required to dissolve the bitter matter, whereas, when my invention is adopted, the essential oil is not subjected to the boiling, and the whole of the useful matter of the hops becomes available.

I effect the said separation by means of distillation. I bring into a suitable still the extract of hops to be operated on, and I add thereto from ten to twenty times its weight of water. Heat is now applied and the mixture is kept boiling until about two-thirds of the water has been evaporated and condensed in the condenser. The condensed oil will be found floating on the surface of the condensed water and the bitter matter will be left in the still in great degree free from essential oil. The distillation may be repeated if it be deemed desirable to eliminate more completely the essential oil from the bitter matter. Inasmuch as both the hop-bitter and the hop-oil are somewhat soluble in water, I find it prudent to use the same water indefinitely in successive operations, thereby preventing the loss of useful substances which would not otherwise be easily avoidable. I recommend also, as a useful expedient, that the condensed water, as fast as it is produced and well separated from the oil, be returned to the still, thereby keeping the bulk of contents of the still nearly constant. Instead of plain water I sometimes find it advantageous to use water in which salt has been dissolved, in order to raise its boiling-point; or instead of the water I use alcohol more or less diluted. The solid residuum of the still, being mainly the hop-bitter, is a new product and a new article of manufacture. It has a consistency similar to that of pitch or bees-wax. It is softened and fusible by heat and dissolves in boiling water, alcohol, ether, chloroform, liquid hydrocarbons, and in fixed oils. In beer-making it is introduced in the boiling part of the process, and the hop-oil is added subsequently, either before or after the fermentation.

I am aware that hop extracts, free from hop-oil, and hop-oil isolated from the other constituents of the hop-plant, are not unknown to chemists and to brewers. The hop-extracts made previous to my hop-extract, patented May 17, 1870, practically contained no hop-oil, and were contaminated with the solvents used in their preparation and with the albuminoid coloring and other undesirable ingredients of the hop-plant; also, hop-oil has often been distilled directly from the hop-plant, but in this case always at the sacrifice of all or a larger part of the hop-bitter.

The hop-extract to which my invention is applicable is such as contains and is mainly constituted of hop-bitter and hop-oil. Such an extract is the one alluded to above as patented by me. The separation of the hop-extract may be effected without the addition of water by a very careful regulation of the heating for distillation; but when water is omitted there is great risk of producing empyreumatic matter, which injuriously contaminates the products.

I claim as my invention—

1. The separation of extract of hops into two portions, in the manner and for the purpose described.

2. The hop-bitter herein described, as a new product and a new article of manufacture.

3. The process of using, in the manufacture of beer, the separated constituents of hop-extract, as herein described.

CHARLES A. SEELY.

Witnesses:
HERMANN KERSTING,
HENRY WURTZ.